United States Patent [19]

Sato et al.

[11] 4,309,297

[45] Jan. 5, 1982

[54] HEAT STORAGE MATERIAL

[75] Inventors: Atsushi Sato, Tokyo; Yoshikazu Murai, Yokohama; Nobuaki Mita, Tokyo, all of Japan

[73] Assignee: Nippon Petrochemicals Company, Ltd., Tokyo, Japan

[21] Appl. No.: 211,249

[22] Filed: Nov. 28, 1980

[30] Foreign Application Priority Data

Nov. 30, 1979 [JP] Japan ................................ 54-155080

[51] Int. Cl.$^3$ ................................................ C09K 5/06
[52] U.S. Cl. ........................................ 252/70; 252/71; 165/1; 165/DIG. 4; 165/104.17
[58] Field of Search ......... 252/70, 71; 165/1, DIG. 4, 165/104 S

[56] References Cited

U.S. PATENT DOCUMENTS 2,726,211  12/1955  Schaefer ................................ 252/70
4,104,185  8/1978  Schroder ............................... 252/70

*Primary Examiner*—Mayer Weinblatt
*Attorney, Agent, or Firm*—Scully, Scott, Murphy & Presser

[57] ABSTRACT

A heat storage material having a melting point in the range of 90° to 100° C. and is excellent in that it is neither corrosive, inflammable nor toxic. The heat storage material comprises a mixture of dimethyl terephthalate and one member selected from the group consisting of dimethyl fumarate and dihydroanthracene.

3 Claims, 3 Drawing Figures

HEAT STORAGE MATERIAL

BACKGROUND OF THE INVENTION

1. Field of the Invention

This invention relates to a heat storage material which consists of a mixture of dimethyl terephthalate and a compound selected from the group consisting of dimethyl fumarate and dihydroanthracene. More particularly, the invention relates to a heat storage material which is suitable for use in devices which utilize, for example, solar energy for room heating or cooling, hot-water supply and so forth.

2. Description of the Prior Art

The characteristic properties that are generally required of heat storage materials are large specific heat and/or large latent heat of fusion, thermal stability, noncorrosiveness, low vapor pressure, noninflammability and innoxiousness.

When the latent heat of fusion is utilized for storing thermal energy, the amount of stored heat can be made large and the volume of the heat storage material can be made small, which are quite advantageous in practice. A material which is suitable for storing thermal energy by its latent heat of fusion is characteristically converted from one phase to another phase when it is heated to its own phase transition temperature. Various materials have been proposed as heat storage materials with the phase transition, for example, inorganic salt hydrates such as calcium chloride hexahydrate (U.S. Pat. No. 4,189,394—J. Schroder et al.), magnesium iodide hexahydrate, sodium sulfate decahydrate, barium hydroxide octahydrate and ammonium aluminum sulfate dodecahydrate; organic compounds or mixtures thereof such as tetradecane, pentadecane, decanol and a mixture of sodium acetate and sodium chloride; and low molecular weight organic salts. When inorganic salts or low molecular weight organic salts are used, however, the problem of corrosion of the thermal system becomes serious. Therefore, the tanks, pipes and other devices of the thermal system are generally made of noncorroding metals so that they are usually heavy and high in thermal conductivity. In addition, they are generally expensive, which increases the construction cost of the thermal energy storage system. Furthermore, there always remains the fear that the tanks or pipes may break, resulting in leakage of solution or fused salts.

If an inorganic salt is mixed with another inorganic salt, a composition having a desired melting point can be obtained. However, if the composition deviates from the eutectic mixture of the inorganic salt components, separation of components occurs during solidification of the fused liquid. Accordingly, only eutectic mixtures are used as the heat storage materials. However, eutectic mixtures of inorganic salts are liable to supercool to temperatures considerably below the eutectic points. Therefore, it is necessary to add seed crystals or a nucleating agent, which causes the above-mentioned separation of components. Incidentally, when a paraffin mixture is employed as the heat storage material, it is not advantageous in practice because the range of melting point is wide and the production cost for pure paraffin is quite high. Furthermore, there are proposed mixtures containing higher fatty acids such as lauric acid, stearic acid and oleic acid (U.S. Pat. Nos. 2,726,211—V.J. Schaefer and 4,100,092—H.O. Spauschus et al., and British Pat. No. 1,558,522—Ciba-Geigy AG). However, the mixtures do not meet the later-described requirement of 90° to 100° C. in melting point.

With the increasing concern over the depletion of ordinary energy sources, considerable attention has been given to the use of solar energy, and various kinds of systems utilizing solar energy are being developed. Solar energy water heaters have already been used in practice. With them, water is heated by solar heat, and the obtained hot water is used as it stands or after being temperature-controlled, for room heating, bathing, cooking and washing. Besides the use of solar energy for heating and cooking with hot water, a new system is now being eagerly developed to drive a Rankine cycle engine by using the obtained hot water for the purpose of cooling. In order to drive the Rankine cycle engine of this system by using water as a heat transfer medium, it is desirable that the water temperature be as high as possible, about 90° to 100° C. Therefore, the key to accomplishing the above system is to develop an improved thermal energy storage material which can store much solar energy at high temperature and which can supply a large quantity of high temperature water. In other words, the heat storage material which is earnestly desired in this technical field is one which is free from the above-described difficulties, which is produced at low cost, and which has a large heat of fusion and a proper melting point in the range of 90° to 100° C.

BRIEF SUMMARY OF THE INVENTION

In order to comply with the above requirements, the inventors of the present application have carried out extensive investigations with regard to various kinds of materials and, as a result, the heat storage material of the present invention has been found.

It is, therefore, the primary object of the present invention to provide an improved heat storage material which meets the foregoing requirements.

Another object of the present invention is to provide a heat storage material which has a melting point in the range of 90° to 100° C. for advantageously utilizing its latent heat of fusion.

A further object of the present invention is to provide a heat storage material which is neither corrosive, inflammable nor toxic, and which can be used quite safely.

Still a further object of the present invention is to provide a heat storage material which has excellent thermal and chemical stability so as to be used repeatedly for a long period of time.

In accordance with the present invention, the heat storage material comprises a mixture of dimethyl terephthalate and a compound selected from the group consisting of dimethyl fumarate and dihydroanthracene. When a heat storage material having a melting point in the range of 90° to 100° C. is required, the mixture is made of 3 to 35% by weight of dimethyl terephthalate and 97 to 65% by weight of dimethyl fumarate, or 20 to 40% by weight of dimethyl terephthalate and 80 to 60% by weight of dihydroanthracene.

The above heat storage material is, of course, suitable for various kinds of uses such as body warmers, foot warmers and rollers of hair curlers as well as for devices which utilize solar energy for room heating or cooling and hot-water supply.

BRIEF DESCRIPTION OF THE DRAWINGS

These and other objects, features and advantages of the present invention will become more apparent to those skilled in the art from the following detailed description of the invention with reference to the accompanying drawings, in which.

DETAILED DESCRIPTION OF THE INVENTION

The characteristics of component compounds used for the heat storage material mixture of the present invention, i.e. dimethyl terephthalate, dimethyl fumarate and dihydroanthracene are given in the following Table 1.

TABLE 1

| Items | Dimethyl terephthalate | Dimethyl fumarate | Dihydro-anthracene |
|---|---|---|---|
| Structural formula | $COOCH_3$ (benzene ring with COOCH_3 at para) | $H_3COOC-C-H$ / $H-C-COOCH_3$ | (dihydroanthracene structure) |
| Molecular weight | 194 | 144 | 180 |
| Melting Point | 140° C. | 101° C. | 108° C. |
| Boiling point | 288° C. | 192° C. | 305° C. |
| Heat of fusion (cal/g) | 39.8 | 54.3 | 31.8 |

In the above Table 1, the melting points and heats of fusion were determined with using the Perkin-Elmer Differential Scanning Calorimeter DSC-2 for a sample size of about 6.0 mg and a temperature rise of 10° C./min.

Figure 1:
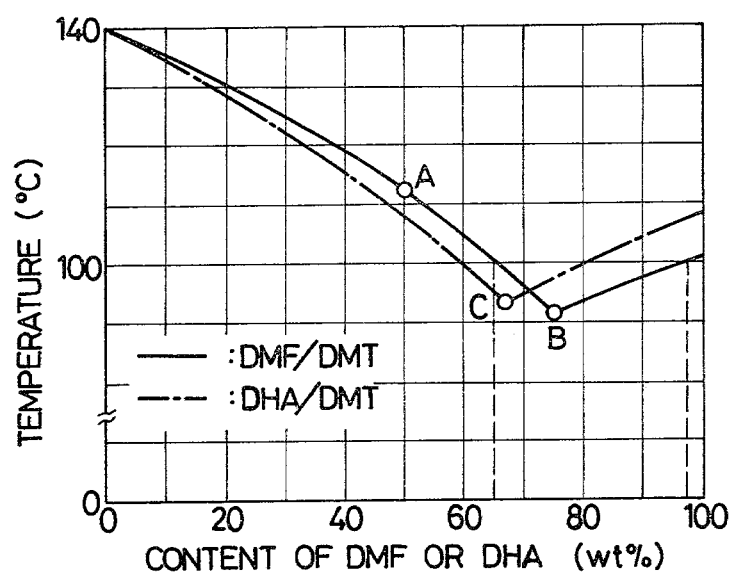
FIG. 1 is a graph showing the relation between the melting points and compositions of the heat storage material according to the present invention.

The melting points of the mixtures of these compounds depend upon the compositions thereof. Shown in FIG. 1 is the relation between the melting point and the composition of a mixture of dimethyl terephthalate and dimethyl fumarate (solid line) and a mixture of dimethyl terephthalate and dihydroanthracene (chain line). In the drawing, the abbreviations "DMT", "DMF" and "DHA" represent dimethyl terephthalate, dimethyl fumarate and dihydroanthracene, respectively. For example, when a mixture of 50% by weight of dimethyl terephthalate and 50% by weight of dimethyl fumarate was fused and gradually cooled, precipitation of dimethyl terephthalate first occurred from the Point A in FIG. 1, and the precipitation proceeded accompanied by changes in the composition of the fused liquid phase. When the mixture reached the Point B, precipitation of both components occured at the fixed temperature of 91.5° C. and the phase change into solid state was completed as it stands. In other words, the melting point of a mixture like the one above is not fixed, but falls within a range of melting point. However, when 25 parts by weight of dimethyl terephthalate and 75 parts by weight of dimethyl fumarate were mixed together to obtain a eutectic mixture, the mixture melted or solidified at a constant temperature of 91.5° C. (Point B in FIG. 1).

Similar phase change occured in the mixture of dimethyl terephthalate and dihydroanthracene, in which the weight ratio of dimethyl terephthalate to dihydroanthracene of the eutectic mixture was 33 to 67, and the melting point thereof was 93.5° C. (Point C in FIG. 1).

Figure 2:
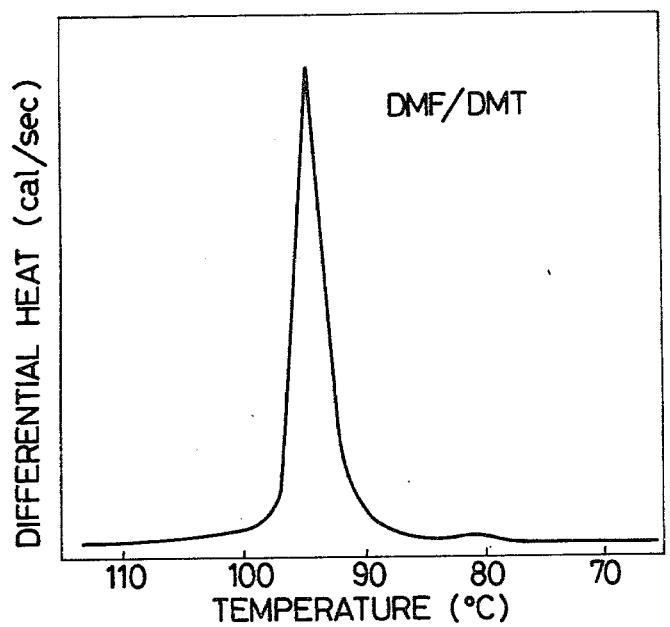
FIG. 2 is a graph showing a DSC (differential scanning calorimeter) thermogram of a eutectic mixture consisting of dimethyl terephthalate and dimethyl fumarate.

Shown in FIG. 2 is the DSC thermogram on the eutectic mixture of the foregoing dimethyl terephthalate and dimethyl fumarate. As seen from FIG. 2, the eutectic mixture had a sharp peak in the range of 90° C. to 100° C., with the temperature of the peak being about 95° C. The heat of fusion of the mixture was 46.5 cal/g. Further, the other eutectic mixture of dimethyl terephthalate and dihydroanthracene was tested likewise and similar results were obtained, in which the peak temperature of the DSC thermogram was about 98.0° C. and the heat of fusion, 33.5 cal/g. From this, it is understood that the latter eutectic mixture can provide the same effects as the former eutectic mixture.

Figure 3:
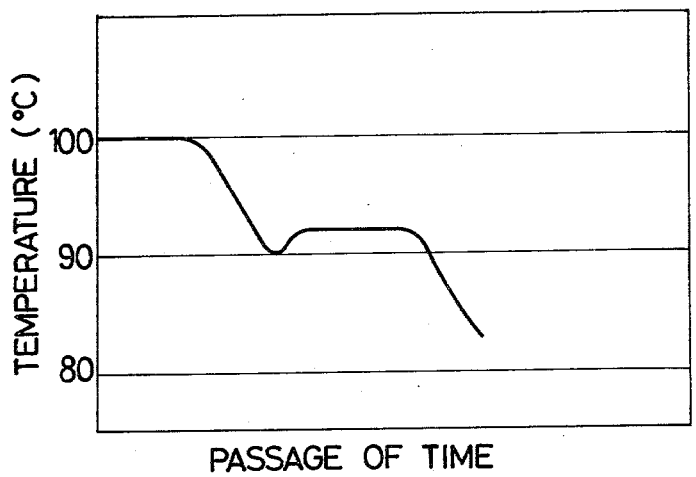
FIG. 3 is also a graph of the cooling curve of the same mixture, showing the relative behaviour of temperature versus time.

Further, the foregoing mixture of dimethyl terephthalate and dimethyl fumarate was fused by being heated to 100° C. and then allowed to cool, and the temperature of the mixture was measured by a thermocouple. The results of this test are shown in FIG. 3. As seen from the figure, the temperature of the above mixture drops to about 90° C. into a supercooled state and, when the supercooled state is broken, the heat with phase change is released at a high temperature of 91° to 93° C. When this phase change is finished, the temperature of the mixture again drops. The temperature during this phase change is the value suitable for the purpose of the present invention. Therefore, it will be understood that the above mixture has quite excellent characteristics to be used as a heat storage material according to the present invention.

Furthermore, the mixing ratio of the dimethyl terephthalate and dimethyl fumarate in the present invention may be so determined that the obtained mixture has a desirable melting point, that is, a temperature in the range of 90° to 100° C. As shown by the dashed lines in FIG. 1, the preferred mixing ratio is 3–35% by weight of dimethyl terephthalate to 97–65% by weight of dimethyl fumarate. In like manner, in the case of the mixture of dimethyl terephthalate and dihydroanthracene, 20–40% by weight of the former is preferably mixed with 80–60% by weight of the latter.

EXAMPLES

In order to confirm the practical effect of the above-described mixtures as heat storage materials, the following tests were carried out.

(a) Preparation of Mixtures

Mixtures M-1, M-2 and M-3 were prepared in accordance with the formulae in the following Table 2.

TABLE 2

| Component (wt %) | Mixture | | |
|---|---|---|---|
| | M-1 | M-2 | M-3 |
| dimethyl terephthalate | 25 | 33 | 32 |
| dimethyl fumarate | 75 | — | 68 |

TABLE 2-continued

| Component (wt %) | Mixture | | |
|---|---|---|---|
| | M-1 | M-2 | M-3 |
| dihydroanthracene | — | 67 | — |

In the above mixtures, the Mixtures M-1 and M-2 were eutectic mixtures and the Mixture M-3 was not a eutectic mixture but included in the scope of the present invention.

(b) Heating Test 9.8 kg of each mixture was dividedly put into 10 of stainless steel made cylindrical tubes of 5 cm in diameter and 50 cm in length and the tubes were sealed up. The tubes were placed in a closed container. This container was then fed with hot water of 100° C. to heat up and fuse the test mixture in the cylindrical tubes. The fusion of text mixture was confirmed by previously inserting a thermometer into the cylindrical tube. After the fusing, heat exchange was carried out by supplying 100 ml/min of 80° C. water in place of the 100° C. hot water.

The temperatures of heated water and the times (hrs.) of discharge were measured which are shown in the following Table 3.

TABLE 3

| Mixture | M-1 | M-2 | M-3 |
|---|---|---|---|
| Temperature (°C.) | 90 | 92 | 90–97 |
| Time (hours) | 5.4 | 4.0 | 4.5 |

It will be understood from the above disclosure that the heat storage material of the present invention is quite useful.

While preferred examples of the invention have been described, it will be understood by those skilled in the art that changes and modifications may be made without departing from the spirit and scope of the invention.

What is claimed is:

1. A heat storage material which consists essentially of a mixture of dimethyl terephthalate and one member selected from the group consisting of dimethyl fumarate and dihydroanthracene, said mixture including dimethyl terephthalate in an amount of 3 to 35% by weight when in combination with dimethyl fumarate, and 20 to 40% by weight when in combination with dihydroanthracene, the balance of said mixture being the corresponding mixture member.

2. The heat storage material claimed in claim 1, wherein said mixture comprises about 25% by weight of dimethyl terephthalate and about 75% by weight of dimethyl fumarate.

3. The heat storage material claimed in claim 1, wherein said mixture comprises about 33% by weight of dimethyl terephthalate and about 67% by weight of dihydroanthracene.

* * * * *